United States Patent [19]

Noble

[11] 3,881,640
[45] May 6, 1975

[54] APPARATUS FOR MEASURING LIQUID IN THE RECONSTITUTION OF ANTIBIOTICS

[76] Inventor: Terrance O. Noble, 1416 E. 72nd St., Minneapolis, Minn. 55423

[22] Filed: Dec. 12, 1973

[21] Appl. No.: 423,974

[52] U.S. Cl. ............... 222/158; 222/450; 222/529; 128/214 C; 128/227
[51] Int. Cl. ............................................ B67d 5/38
[58] Field of Search .................... 222/154–158, 222/23, 29, 74, 26, 189, 529, 528, 450; 128/214 R, 214 C, 214 D, 214.2, 272, 227; 251/4, 7–10; 73/427; 23/292, 259

[56] References Cited
UNITED STATES PATENTS

| | | | |
|---|---|---|---|
| 525,232 | 8/1894 | Reese et al. | 222/189 X |
| 989,503 | 4/1911 | Hildebrand | 222/529 X |
| 2,722,932 | 11/1955 | Hickey | 128/214.2 |
| 3,191,600 | 6/1965 | Everett | 128/214 R X |
| 3,419,245 | 12/1968 | Scola | 251/10 |
| 3,438,607 | 4/1969 | Williams et al. | 251/9 |
| 3,774,603 | 11/1973 | McPhee | 222/158 X |

Primary Examiner—Robert B. Reeves
Assistant Examiner—Charles A. Marmor
Attorney, Agent, or Firm—Merchant, Gould, Smith & Edell

[57] ABSTRACT

A graduated enclosed vessel with venting and flow control devices for measuring and dispensing a liquid. An inlet tube is provided for directing liquid entering the vessel toward the vessel wall to prevent foaming of the liquid as it enters the vessel. A pinch-type clamp retained in a fixed position on a flexible outlet tube controls the flow of the measured amount of liquid from the vessel.

7 Claims, 5 Drawing Figures

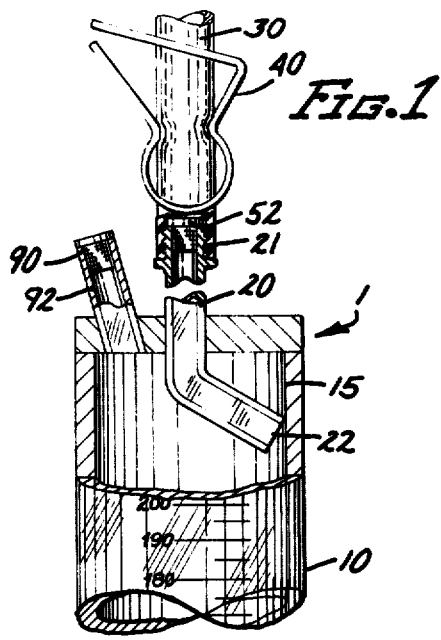
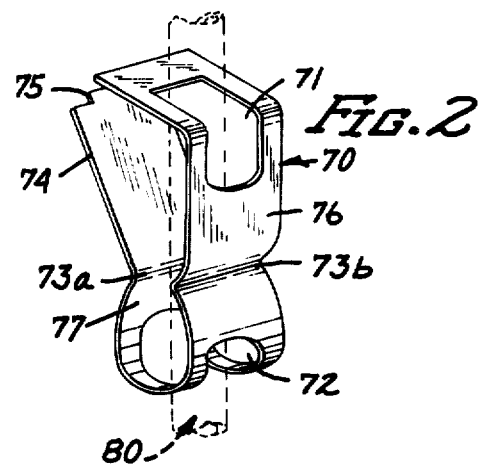
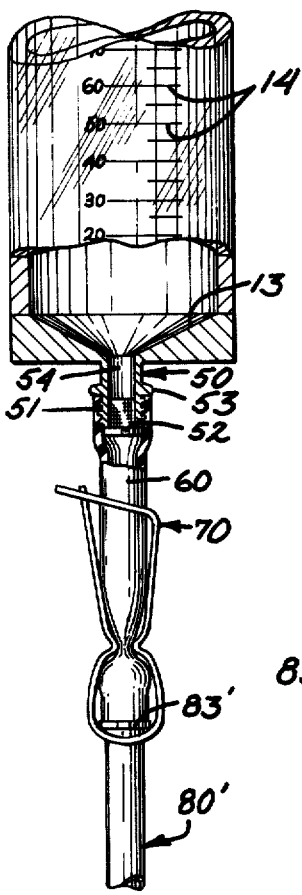
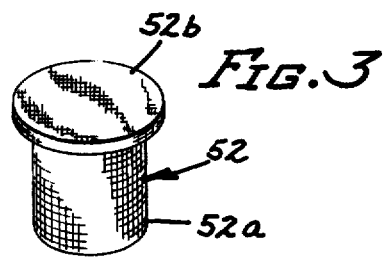
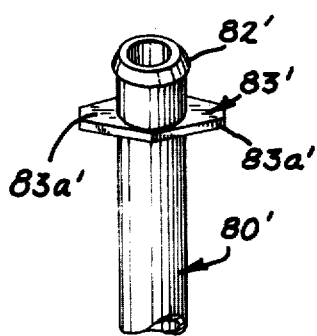

APPARATUS FOR MEASURING LIQUID IN THE RECONSTITUTION OF ANTIBIOTICS

The invention relates generally to a graduated vessel having a valved inlet and outlet for liquid measurement, and is specifically directed to a water measuring vessel to be used by pharmacists in the accurate reconstitution of antibiotics.

Antibiotics are usually made available to the consumer or patient in liquid form. For storage purposes, however, the antibiotic is made available to the pharmacist as a dry powder, which must be accurately mixed by the pharmacist with a precise volume of distilled water at the time the patient's prescription is filled.

The age old and traditional manner of reconstituting antibiotics has been with the use of a graduated conical beaker, which the pharmacist fills to the desired level from a distilled water source. Although use of a graduated beaker renders generally satisfactory results, there are a number of specific drawbacks. First, it is imperative that the precise volume of water be mixed with the dry antibiotic, and the graduated beaker method does not lend itself to great accuracy. More specifically, since the conical beaker must necessarily be held or placed some distance below the distilled water outlet, it has been quite difficult for the pharmacist to accurately estimate the precise time at which the water outlet should be closed so that the water level in the conical beaker is accurate. Further, water entering the conical beaker usually splashes to some extent, causing air bubbles which have an adverse effect on readability of the graduations. It is also difficult to accurately read the volume of water in the beaker because of the substantial meniscus resulting from the distilled water-glass relationship. These problems are all amplified when the conical beaker is hand-held. It will also be appreciated that the procedure usually requires both of the pharmacist's hands; and it is always time consuming and tedious.

My invention is directed to apparatus which represents an entirely different approach to liquid measurement for the reconstitution of antibiotics, and which permits highly accurate water measurement with great ease on the part of the pharmacist. Specifically, the invention comprises a graduated enclosed vessel which is connected directly to the distilled water source through a supply tube which contains a shut-off valve. Water enters the vessel through an inlet tube the upper end of which is attachable to the supply tubing, and the inlet tube extends through the top of the enclosed vessel and terminates at a point adjacent the vessel wall so that the entering liquid is directed to the wall and flows down the wall to the bottom of the vessel, thereby preventing splashing. The measured quantity of liquid in the graduated vessel is released through a flexible outlet tube which includes a pinch-type clamp. The flexible outlet tube is disposed in a fixed position relative to the vessel, and the clamp is disposed in a fixed position relative to the outlet tube. Accordingly, the water in the flexible outlet tube is a known, fixed volume, and represents a known quantity in calibrating the graduations of the vessel. Both the inlet and outlet tubes of the vessel include filter plugs to constantly insure cleanliness of the water. A vent tube also including a plug filter extends through the top of the vessel to equalize pressure in the vessel as it is filled or emptied.

Preferably, the vessel itself takes the form of an elongated cylinder and is formed from acrylic material. Such material is sufficiently light so that the device can be inserted into the supply tubing extending from the distilled water supply, for support thereby without impairing water flow properties (such as by kinking hoses and the like). Further, the acrylic material gives rise to a neglible meniscus, thereby resulting in a highly accurate readout of water in the vessel.

Because of its unique construction, the inventive apparatus permits pouring and measuring to be completed simultaneously and with only one hand, in substantial distinction to the process using the graduated beaks, which requires both of the pharmacist's hands and two operational steps (pouring and measuring).

An additional and significant feature of the inventive measuring apparatus is that it need never be washed. This is true because, other than the water passing through the apparatus, the system is essentially closed, the plug filter in the air vent tube preventing particle or dust contamination to enter the vessel. Further, the vessel is self-cleaning since it rinses itself at every usage with sterile, distilled water. By comparison, the graduated beakers used in the reconstitution of antibiotics must be thoroughly washed each time they are used.

Other additional and significant features of the inventive measuring apparatus are its unbreakability, as compared with graduated beakers which are made of glass; the fact that it requires no stand or storage space in the pharmacist's facility; and that it is impossible to spill even when filled.

BRIEF DESCRIPTION OF THE DRAWINGS

FIG. 1 is a fragmentary sectional view in side elevation of liquid measuring apparatus embodying the inventive principle;

FIG. 2 is a perspective view of a pinch-type finger clamp used in conjunction with the inventive liquid measuring apparatus;

FIG. 3 is an enlarged perspective view of a filter plug used with the inventive liquid measuring apparatus;

FIG. 4 is an enlarged perspective view of a rigid outlet tube for the inventive liquid measuring apparatus; and FIG. 5 is an enlarged perspective view of an alternate form of the rigid positioning outlet tube.

DESCRIPTION OF THE PREFERRED EMBODIMENT

FIGS. 1-4 show the elements of a preferred embodiment of the measuring device 1. FIG. 5 shows a second embodiment of a particular element of measuring device 1. Throughout the figures, like numerals refer to like elements of the invention.

Referring to FIG. 1, an enclosed graduated vessel 10 is used to retain a measured amount of liquid which flows into it through an intake tube 20. The vessel 10 is shown as being cylindrical but other suitable shapes may also be used. Graduation markings 14 indicate the volumetric measure of the liquid contained in vessel 10. The graduations 14 may be etched on the surface of the vessel 10, or provided by application of a decal or the like. In the embodiment shown in FIG. 1, vessel 10 is constructed of a transparent material so that the amount of liquid contained therein can be readily determined by gauging the meniscus of the liquid against graduations 14. While vessel 10 may be constructed of numerous materials, an acrylic resin is particularly desirable in that it results in a negligible meniscus on the liquid contained therein, thereby effecting a highly accurate readout.

Liquid flows to vessel 10 through a supply tube 30 which connects to intake tube 20. In the embodiment shown, supply tube 30 is a flexible tubing. Other types of supply tubing may be used, but the use of a flexible tube allows the measuring device 1 to be easily handled and maneuverable when necessary. When the supply tube 30 is a flexible tube, a pinch-type clamp 40 can be used to close off the supply tube 30 when the desired amount of liquid has entered the vessel 10. Other types of shut-off devices may be used to close off supply tube 30.

Intake tube 20 is a rigid tube which sealably extends through the top portion of vessel 10 and which has threads 21 at its upper end. The use of threads 21 allows the intake tube 20 to be securely retained in the open end of flexible supply tube 30. The portion of intake tube 20 which extends into vessel 10 is contoured so that outlet opening 22 of intake tube 20 is adjacent to vessel side wall 15. This positioning of opening 22 allows the liquid coming into vessel 10 through intake tube 20 to engage and flow down wall 15 of the vessel rather than being poured into the midportion of vessel 10. This means of admitting liquid into vessel 10 precludes bubbling of the liquid as it enters the vessel. If bubbling of the liquid is permitted, the meniscus of the liquid in vessel 10 is uneven and difficult to gauge against graduations 14.

In the embodiment shown in FIG. 1, an outlet stem 50 extends from the lower portion of vessel 10. A bore 54 extends through stem 50 into vessel 10. A conical depression 13 is formed in the lower portion of vessel 10 with its apex joining bore 54 to form an outlet for the flow of liquid from vessel 10. The conical depression 13 insures that all liquid entering the vessel 10 leaves through the outlet stem 50. Where the shape of vessel 10 is different than that shown in FIG. 1, other means may be provided for assuring the downward flow of liquid from the vessel. Outlet stem 50 has threads 51 and an adjoining shoulder 53 on its outer surface near its open end 51a. A flexible outlet tube 60 is secured to outlet stem 50 by slipping the tube 60 over the threads 51. The end of flexible tube 60 will abut the shoulder 53 so that the location of tube 60 relative to outlet stem 50 is fixed. Means are provided for sealing off flexible tube 60 and will be discussed subsequently.

To filter the liquid flowing into and out of vessel 10, a plug filters 52 are inserted into the inlet of tube 20, and into the bore 54 of outlet stem 50. Filter has a cylindrical portion 52a which has a diameter slightly less than the diameter of the inside bores of tube 20 and stem 50, permitting its insertion therein. Attached to cylindrical portion 52a is an annular flange 52b which extends radially outward and has a diameter equal to the outside diameters of tube 20 and outlet stem 50. Shoulder 52b allows filter 52 to be abuttably seated against the ends of tube 20 and stem 50. The filter 52 is easily removeable and disposable and can be made of any material suitable for the type of filtering desired for the liquid being measured by vessel 10.

To prevent a pressure buildup in vessel 10 as liquid is poured into it or to prevent a vacuum from being drawn in the vessel as it is emptied, a vent tube 92 is provided in the top portion of vessel 10. To prevent airborne particles from entering vessel 10 through vent tube 92, a filter 52 is also inserted into its inlet opening 90 in the same manner as for tube 20 and stem 50.

Valve means are provided at both the inlet and outlet of vessel 10 to control the flow of liquid to and from the vessel. In the embodiment shown in FIG. 1, a pinch-type clamp 40 is affixed to supply tube 30 to control the flow of liquid into vessel 10 through intake tube 20. Since distilled water and other commonly used liquids often come in bulk containers having flexible outlet tubes attached to them, such tubes serve as the supply tube 30 in the present invention and a clamp such as pinch-clamp 40 is particularly useful as a control means. Other types of valve means for closing off supply tube 30 may also be used.

To close off the flow of liquid from vessel 10 through flexible outlet tube 60, a pinch-clamp 70 in combination with a rigid positioning tube 80 is used. As was noted earlier, one end of flexible outlet tube 60 is attached to outlet stem 50 by sliding outlet tube 60 over threads 51. The other end of flexible outlet tubing 60 is attached to rigid positioning tube 80. The purpose of positioning tube 80 is to form a securing means for holding pinch-clamp 70 in place, and its structure is described in detail below. It is important that pinch-clamp 70 have a fixed location relative to vessel 10 so that the volume of liquid contained in flexible tube 60 between outlet stem 50 and clamp 70 is constant. This would not be the case if clamp 70 were free to move on flexible tube 60.

In the preferred embodiment of FIG. 2, a pinch-clamp 70 consists of a single piece of flat resilient material which has been formed into a figure-eight shaped clamp body 76 having a lower loop portion 77. An upper opening 71 and a lower opening 72 are formed in clamp body 76 for flexible tube 60 to extend through. The flow of liquid in flexible tube 60 is shut off by forcing two opposed sides 73a and 73b of clamp body 76 together against flexible tube 60 contained between the opposed sides. A flange 74 of clamp body 76 adjoins side 73a. By moving flange 74 from a biased open position in which sides 73a and 73b are spread apart to a closed position, side 73a is moved toward side 73b to close off the flexible tubing 60. Flange 74 can be secured in its closed position by means of a tab 75 formed by an extension of flange 74 and which passes through a portion of opening 71 in clamp body 76. Tab 75 can be easily inserted into and removed from opening 71 to close and open clamp 70 by merely squeezing of the operator's thumb and finger together.

To hold pinch-clamp 70 in a fixed location on flexible tube 60 relative to outlet stem 50, the bottom loop 77 of clamp body 76 is formed to fixably fit over a rigid positioning tube. FIG. 4 shows a first preferred embodiment of a positioning tube 80, and FIG. 5 discloses an alternative positioning tube 80'.

Referring to FIG. 4, an enlarged head 82 is formed at the top of positioning tube 80, the head 82 being rounded to facilitate insertion into the flexible outlet tubes 60. Head 82 is sized so that, when inserted into the flexible tube 60, it can pass through the opening 72 and be received within lower loop portion 77 of clamp 70. In the embodiment of FIG. 4, opposed sides of the head 82 are shaved off slightly, as at 82a, permitting the narrowest dimension of head 82 to pass through the opening 72. In order to rigidly retain positioning tube 80 relative to the clamp 70, head 82 includes opposed, outwardly projecting flanges 82b, which cause the largest dimension of head 82 to be greater than the narrowest or side-to-side dimension of opening 72. It will therefore be appreciated that, after insertion of the head 82 through opening 72 into lower loop portion 77, positioning tube 80 can be rotated so that the flanges 82b overlie the thin side portions adajacent the opening 72, positively securing the positioning tube 80 relative to the clamp 70. Positioning tube 80 further includes an annular shoulder 83 which is axially spaced from head 82. The diameter of shoulder 83 is greater than that of the flexible tube 60, and thereby serves as a stop which abuttably engages the lower end of outlet tube 60 and fixably locates positioning tube 80 in the end of outlet tube 60. In the secured position, shoulder 83 is outside or below the lower loop portion 77 of clamp 70.

With reference to FIG. 5, positioning tube 80' includes a somewhat smaller head 82' which is tapered or truncated to facilitate insertion into the flexible tube 60. Positioning tube 80' includes a similar shoulder 83' which is adapted to be abuttably engaged by the lower end of flexible tube 60, and which defines opposed wing flanges 83a. In the embodiment of FIG. 5, however, the shoulder 83' is disposed sufficiently close to the head 82' to permit it to be positioned within the lower loop portion 77 with the head 82'. To this end, the narrowest dimension of shoulder 83' permits its passage through the opening 72, and the wing flanges 83a' are together longer than the narrowest dimension of opening 72. Accordingly, after insertion through the opening 72, positioning tube 80' is rotated so that the wing flanges 83a' overlie the thin side portions adjacent opening 72 to fix the position of tube 80' relative to clamp 70.

Where the length of flexible tube 60 is known, the insertion of positioning tube 80 or 80' to a known position within flexible tube 60 (by reason of the stopping engagement with shoulder 83 or 83'), and the subsequent locking of positioning tube 80 or 80' within lower loop portion 77, together give rise to a fixed volume between the conical depression 13 and the point at which flexible tube 60 is pinched off by clamp 70; and the graduations 14 are calibrated accordingly. This enables the user to make a highly accurate readout of water in the vessel 10, thereby insuring the proper mixture of water with the dry antibiotic It is the purpose of measuring device 1 to contain and dispense a measured amount of liquid. To accomplish this function the operation of measuring device 1 can be summarized as follows. The supply tube 30 is attached to a source of liquid to be measured (not shown). In many instances, such as in the case of distilled water, a flexible dispensing tube is provided with the source of liquid. In such a case the dispensing tube from the source of liquid would be the flexible supply tube 30 shown in FIG. 1. The source of liquid would be positioned above the measuring device 1 so that the liquid would flow downwardly from a supply container. Because inlet tube 20 has threads 21 which insert into the supply tube 30, sufficient tension is provided between inlet tube 20 and supply tube 30 to support measuring device 1 without the use of a holding bracket or securing clamps. A clamp means 40 on flexible supply tube 30 is in a normally closed position to prevent liquid from passing through supply tube 30 into vessel 10. When it is desired to admit liquid into measuring device 1 from its supply, clamp 40 is moved to its open position so that the liquid can flow into vessel 10. The clamp 40 is kept open long enough for the level of liquid in vessel 10 to reach the desired height as determined by graduations 14. The liquid entering vessel 10 is directed to the side wall 15 of the vessel to prevent splashing and bubbling of the liquid inside of the vessel. During the filling of vessel 10, trapped air contained in vessel 10 is vented through vent tube 92 to prevent a pressure buildup in vessel 10 which would impede the filling of the vessel.

After the desired amount of liquid has flowed into vessel 10, the clamp 40 in supply tube 30 is closed to prevent the further flow of liquid. The measured amount of liquid in vessel 10 is then ready to be transferred to a receiving container. This receiving container may be a bottle of pharmaceuticals or the like which is to be mixed or reconstituted with the liquid from the vessel 10. The rigid positioning tube 80 is then positioned in the receiving container and the outlet pinch-clamp 70 is opened from its biased closed position by thumb and finger pressure. The measured amount of liquid contained in vessel 10 is then completely emptied into the receiving container. If too much liquid has been inadvertently admitted into vessel 10 or if for some other reason it is desired that only a part of the liquid in vessel 10 be emptied out, the amount emptied can still be gauged by merely selecting a lower graduation mark whereby the difference between it and the present level of liquid represents the volume to be emptied. Clamp 70 is then opened until the liquid level drops to the pre-selected graduation mark.

Because the outlet tubing 60 is flexible and the clamp 70 is located near the end of outlet tube 60, the person measuring out the liquid can agitate the receiving container while holding the pinch-clamp 70 in an open position, even by a one-handed operation if desirable. This agitation helps mix the liquid with the agent in the receiving container. This is particularly desirable where dry agents such as antibiotics are being reconstituted. In such a case the powder space prevents the entire amount of liquid from being added to the receiving container at one time and it must be done gradually as the powder dissolves. When vessel 10 has been emptied, the clamp 70 is closed and the measuring device 1 is ready for another measuring and dispensing operation.

I claim:

1. A device for dispensing liquid from a source of liquid having a flexible outlet supply tube, comprising:
   a. a substantially enclosed vessel having top, bottom and side walls;
   b. an inlet tube mounted in said vessel top wall for filling the vessel, said inlet tube having a first end located inside of the vessel adjacent to said side wall and a second end outside the vessel adapted for connection to the supply tube of said source of liquid;
   c. inlet valve means for selectively controlling liquid flow through said inlet tube;
   d. an air vent tube located in the top wall of said vessel for venting air to and from said vessel;
   e. outlet means in the bottom wall of said vessel for dispensing liquid from said vessel;
   f. a flexible outlet tube having first and second ends, said first end securely attached to said vessel outlet means in fixed spatial relationship with said vessel;

g. outlet valve means fixably located relative to said vessel outlet means for selectively controlling the flow of liquid through said flexible outlet tube; and h. a rigid positioning tube insertable into the second end of said flexible outlet tube, the upper end of said positioning tube defining an enlarged head portion to frictionally engage the inside of the outlet tube; said positioning tube further including a shoulder portion spaced a predetermined distance from the enlarged head portion for abuttable engagement with the second end of said outlet tube to locate the positioning tube in fixed spatial relationship to said flexible outlet tube; and said outlet valve means comprising a finger operated clamp moveable between tube clamping and tube release positions, said clamp having a clamp body with a positioning recess to retainably receive the enlarged head portion of the positioning tube for retaining said clamp.

2. The device defined by claim 1, wherein:

a. the positioning recess of the clamp body includes an entrance opening of length greater than its width;

b. and opposite sides of the enlarged head portion project radially outward an amount greater than the width of the recess opening, whereby said enlarged head portion can be inserted through said opening and rotated to preclude removal thereof.

3. The device defined by claim 2, wherein the shoulder portion of the positioning tube is disposed outside the positioning recess of the clamp body.

4. The device defined by claim 1, wherein:

a. the positioning recess of the clamp body includes an entrance opening having a length greater than its width;

b. and the shoulder portion of the positioning tube comprises a pair of opposed wing flanges extending radially outward from the tube, the distance between the flanges being greater than the width of the recess opening, whereby said flanges can be inserted through said opening and rotated to preclude removal thereof.

5. The measuring device of claim 1 including filter means removably inserted in said inlet tube and in said outlet tube to filter the liquid passing therethrough.

6. The measuring device of claim 5 including filter means removably inserted in said air vent tube to filter the air passing therethrough.

7. A device for automatically measuring and dispensing a specific quantity of liquid, comprising:

a. an enclosed graduated transparent cylindrical vessel having top, bottom and side walls;

b. a rigid inlet tube mounted in the top wall of said vessel, said inlet tube having a threaded end located outside of said vessel and a second end terminating inside of said vessel at a point adjacent to the vessel side wall;

c. a flexible supply tube for carrying liquid from a source of liquid to said inlet tube, said supply tube having one end connected to said source of liquid and a second end connection to said inlet tube;

d. a finger-operated clamp attached to said flexible supply tube for controlling the flow of liquid therethrough;

e. a cylindrical vent tube extending through the top wall of said vessel for venting air flowing to and from said vessel;

f. a removable filter inserted into said vent tube for filtering air flowing therethrough;

g. an outlet stem mounted in the bottom wall of said vessel, said outlet stem having an outlet end and a threaded outer surface adjacent to said outlet end;

h. a removable filter inserted into said outlet stem for filtering liquid passing therethrough;

i. a flexible outlet tube having first and second ends, said first end securely attachable to the threaded portion of said outlet stem in fixed spatial relationship with said vessel bottom wall;

j. a rigid positioning tube having a first end with an enlarged head portion adjacent thereto, and a shoulder portion spatially removed from said head portion, said head portion insertable in the second end of said flexible outlet tube with said shoulder portion abutably engaging the second end of said flexible outlet tube; and k. a finger-operated clamp comprising a clamp body having at least two opposed wall portions movable towards one another, said flexible outlet tube insertable between said movable wall portions, said clamp body further defining a positioning recess sized to accommodate the enlarged head portion of said positioning tube to thereby locate said finger-operated clamp in fixed spatial relationship with respect to said positioning tube.

* * * * *